United States Patent [19]

Hatanaka et al.

[11] 4,025,758

[45] May 24, 1977

[54] AUTOMATIC MONEY-ISSUING APPARATUS

[75] Inventors: Yoshihiro Hatanaka; Hideto Shigemori; Akio Ueba, all of Himeji, Japan

[73] Assignee: Glory Kogyo Kabushiki Kaisha, Japan

[22] Filed: July 10, 1975

[21] Appl. No.: 594,695

Related U.S. Application Data

[60] Continuation of Ser. No. 406,869, Oct. 16, 1973, which is a division of Ser. No. 179,045, Sept. 9, 1971, Pat. No. 3,784,790.

[30] Foreign Application Priority Data

Sept. 11, 1970 Japan .............................. 45-79763

[52] U.S. Cl. ................................ 235/61.7 R; 221/9

[51] Int. Cl.[2] ................. G06K 15/00; G06K 15/06; G07F 11/00

[58] Field of Search .............................. 235/61.7 R; 194/DIG. 9 B; 221/9

[56] References Cited

UNITED STATES PATENTS

| | | | |
|---|---|---|---|
| 3,648,020 | 3/1972 | Tateisi et al. | 194/DIG. 9 |
| 3,760,158 | 9/1973 | Whitehead et al. | 235/61.7 R |
| 3,761,682 | 9/1973 | Barnes et al. | 235/61.7 B |
| 3,784,790 | 1/1974 | Hatanaka et al. | 235/61.7 B |

*Primary Examiner*—Vincent P. Canney

[57] ABSTRACT

An automatic money-issuing system adapted to automatically issue bank notes and a necessary amount of money of predetermined denominations with the aid of a tape information input or a manual input, which comprises a device adapted to indicate an amount of money to be paid, a circuit storing a signal from the device, a means to issue bank notes or coins, a circuit adapted to compare the amount of money issued with the amount of money indicated, and a device adapted to stop the operation of the device issuing money by a coincidence signal issued from a comparison circuit.

1 Claim, 6 Drawing Figures

AUTOMATIC MONEY-ISSUING APPARATUS

This is a continuation of application Ser. No. 406,869 filed Oct. 16, 1973, which in turn is a division of application Ser. No. 179,045 filed Sept. 9, 1971, and now U.S. Pat. No. 3,784,790 issued Jan. 8, 1974.

BACKGROUND OF THE INVENTION

The present invention relates to an automatic money-dispensing system which issues a required amount of money either in response to information fed thereto by tape input or by manual input.

Manual or semi-manual systems of dispensing currency will be acceptable only under certain limitations.

A cash-dispenser for automatically dispensing a required amount of money as desired by an operator of the machine is well-known in the art. A money-dispenser of the above type may be fixedly provided on the wall of a bank so that bank customers are able to receive money therefrom as desired. The well-known money-dispenser contains a number of packages each containing a pre-determined amount of money, and therefore when a bank customer appropriately instructs the machine, money is dispensed according to the number of packages required.

However, a money-dispenser of the above type possesses many disadvantages and its application to the task of dealing with money in a bank and the like is limited.

SUMMARY OF THE INVENTION

It is accordingly a main object of the present invention to eliminate the above-mentioned disadvantages.

A primary object of the invention is to provide an automatic money-dispensing system in which the input of a monetary quantity, which is a generic term including an amount of money and a number of pieces of money, can be achieved selectively by feeding thereto information on a punched tape or the like or by manually operating the machine. Which ever method is selected, the monetary quantity or amount of money is automatically paid to the operator of the machine.

Another object of the invention is to provide an automatic money-dispensing system which can be employed for paying wages and salaries and other such tasks usually carried out by banks and similar facilities.

Another object of the present invention is to provide an automatic money-dispensing system in which currency notes and coins of predetermined denomination are automatically issued out with a necessary amount of money or with a minimum number of sheets thereof by reading information punched on a tape or by manually depressing the push buttons of a decimal keyboard.

Accordingly, the present invention provides an automatic money-dispenser which is selectively operatively responsive to either a manual operation or information fed thereto on a tape or the like. Hence the scope of application of the cash-dispenser according to the instant invention is much increased.

As apparent from the contents of the Specification hereinafter described, predetermined notes can be issued correctly and quickly with a necessary amount of money through a simple operation. Therefore, the present invention is useful for saving man power and the notes can be issued with a minimum number of sheets thereof as required. Furthermore, a code for people to be paid is also displayed, and therefore confirmation or identification of the people to be paid can be readily accomplished. In addition, the note-issuing operation is performed by either reading of the information on the tape or operation of a decimal keyboard, and therefore it should be noted that there is flexibility in use of the system according to the present invention.

Various further and more specific objects, features and advantages of the present invention will be apparent from the description given below, taken in conjunction with the accompanying drawings illustrating by way of example a preferred embodiment of this invention.

DETAILED DESCRIPTION OF THE INVENTION

Figure 1:
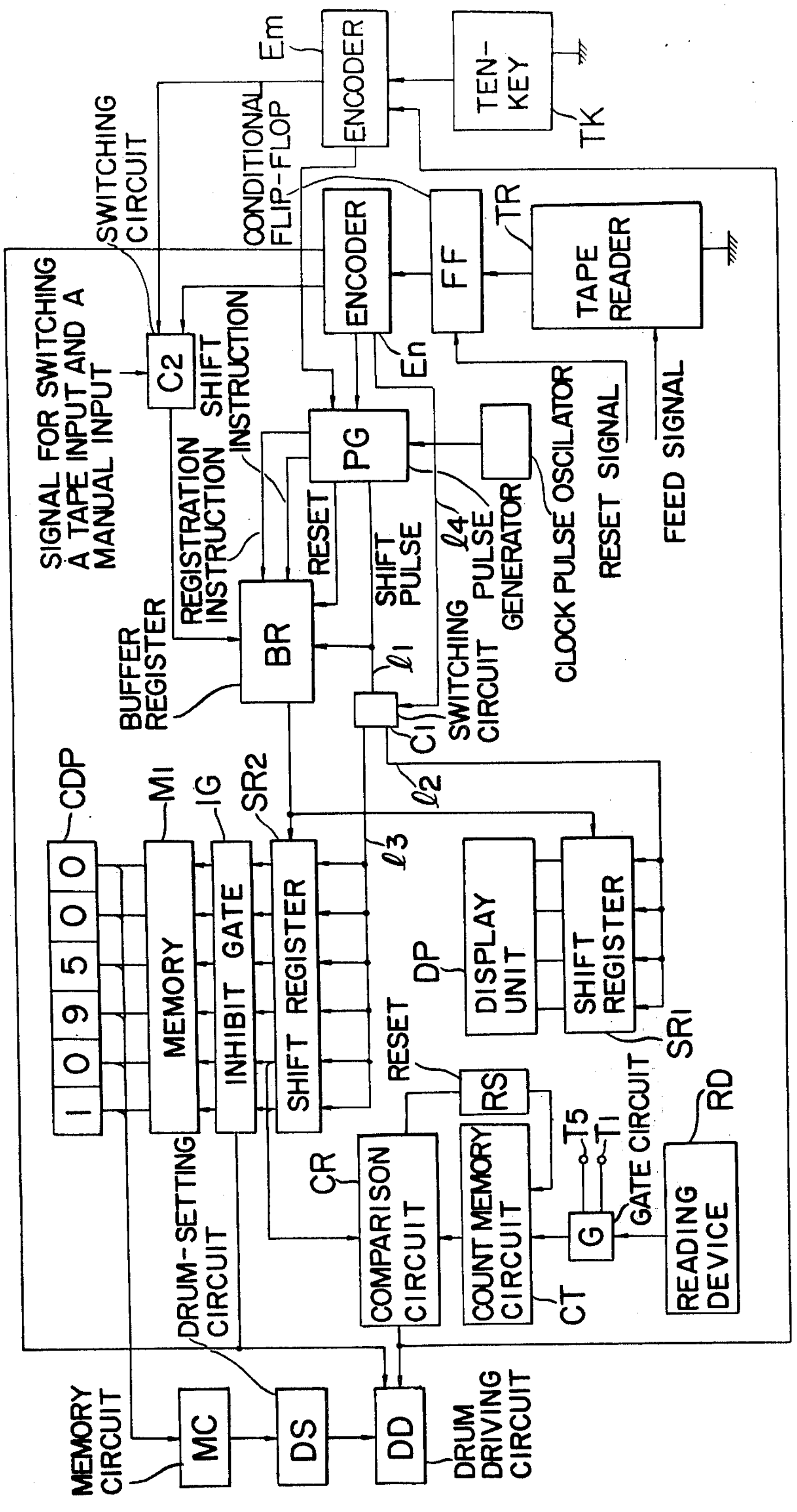
FIG. 1 is a block diagram illustrating an embodiment according to the present invention.
Figure 2:
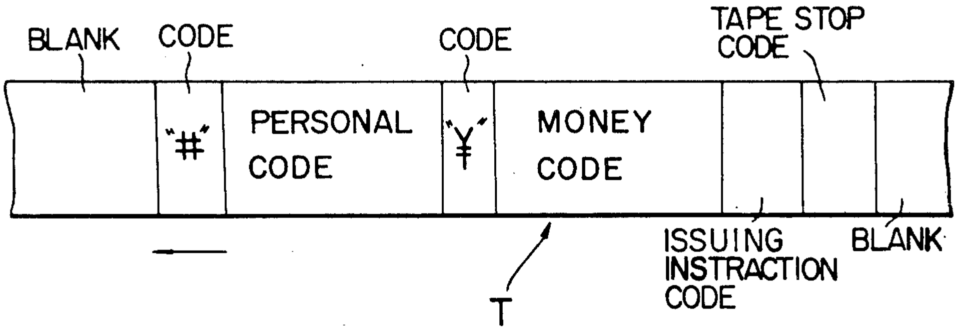
FIG. 2 exhibits the contents of information punched on a tape.

With reference now to FIG. 1, a tape punched with information as shown in FIG. 2 is fed to a tape reader TR where the information is read out. In case of a wage payment, the tape T is punched, in advance, in the order of inputs, with information such as a symbol code " # ", a personnel-code, a symbol code "¥", a code for an amount of money to be paid, an instruction code for issuing notes and a tape-stopping code as shown in FIG. 2.

Now, when a start button (not shown) is depressed, the tape T is fed to the tape reader by a feed signal thereby firstly to read a # signal positioned first in the information and then the # signal is once stored in a conditional flip-flop FF. The # symbol means that a signal following it represents the personnel code. Therefore, a signal representing # is converted into a personnel-code-switching instruction by an encoder En, and then the instruction is applied to a switching circuit $C_1$ through a lead wire $l_4$ thereby to switch the circuit $C_1$ over to the personal code side, as a result of which a shift pulse input lead wire $l_1$ of the circuit $C_1$ is connected to a lead wire $l_2$ running to a shift register $SR_1$. The information thus stored by the flip-flop FF is reset by a reset signal before the tape reader TR completes reading-out of the next code.

Then, after having been stored in the flip-flop FF, a signal representing a numeral on the most significant digit of said code is fed to the encoder EN thereby to be converted into a binary-coded decimal signal BCD. The signal BCD is fed to a buffer register BR through a circuit $C_2$ which is adapted to switch a tape input and a manual input. The switching circuit $C_2$ is kept switched over to a tape input side during an operation of the tape reader TR. At the same time, a registration instruction is given to the buffer register BR through a pulse generator PG from the encoder En. Therefore, the buffer register BR stores one digit by the above-mentioned BCD input and register instruction.

Then, together with a shift instruction four shift pulses comprising one-digit shift pulses are applied to the buffer register BR from the pulse generator PG, as a result of which the buffer register BR transfer the registered information to a shift register $SR_1$ adapted for display of the personal code and on the next stage. The above-mentioned four shift pulses are fed to the code display shift register $SR_1$ through the switching circuit $C_1$. Therefore, the register $SR_1$ receives the information and shift pulse from the buffer register BR thereby to store one digit and then to display it by means of a display unit DP.

At this juncture, information positioned at the second place from the most significant digit is read out by the tape reader TR. However, information stored before this reading process is shifted one digit leftwardly, as a consequence of which information of two digits is registered in the shift register $SR_1$.

Similarly, the code having been read by the tape reader TR is succeedingly registered from the higher significant digit thereof in the shift register $SR_1$ and is then shifted, as a result of which, when the code on the tape is completely read out, numerals on all the digits are displayed on a code display tube DP.

Next, the tape reader will read the ¥ code, which means that the next information is the amount of money to be issued. Therefore, upon completion of reading the ¥ code, an instruction switching the code over to the amount of money is furnished from the encoder En whereby the switching circuit $C_1$ is switched over to the side of amount of money, whereby the lead wire $l_1$ is connected to a lead line $l_3$.

A code of an amount of money for payment, which is to be read next, is converted into a binary-coded signal of four bits by the encoder En for every digit. However, unlike the case of the foregoing personnel code, in the code of the amount of money for payment, binary-coded signals as shown below are, for instance, used in order to minimize a number of notes or bills to be issued.

TABLE

| Decimal Number | Code for Binary-Coded Signal | | | |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 1 | 1 |
| 5 | 1 | 0 | 0 | 0 |
| 6 | 1 | 0 | 0 | 1 |
| 7 | 1 | 0 | 1 | 0 |
| 8 | 1 | 0 | 1 | 1 |
| 9 | 1 | 1 | 1 | 1 |

As apparent from the above table, the code of the amount of money for payment, which has been converted into the binary-coded signal code is registered in a shift register $SR_2$ provided for an amount of money to be paid, in the same manner as that in the case of the personnel code mentioned above.

As a note-issuing instruction described later is not applied to an inhibit-gate circuit IG, the content of the register $SR_2$ is stored in a memory circuit $M_1$ through the inhibit-gate circuit IG, and is then displayed, in a decimal system, by a display unit CDP adapted to display an amount of money. In other words, the amount of money to be payed is displayed, in a decimal system on the display unit CDP upon completion of the registering operation.

Hereinafter, a note-issuing operation is described, assuming, for example, that display of the amount of money to be paid is made for 109,500 yen, or the display is 109,500.

When the tape reader TR has read the note-issuing code, a note-issuing instruction is fed from the encoder Er to both the inhibit-gate circuit IG and a drum-driving circuit DD, and the inhibit-gate circuit IG inhibits the contents of the register $SR_2$ from being applied to the memory $M_1$. Therefore, the display content of the display unit CDP is kept unchanged.

When the note-issuing instruction is fed to the drum-driving circuit DD, it starts issuing notes until a coincidence signal from a comparison circuit CR is applied thereto.

Figure 3:
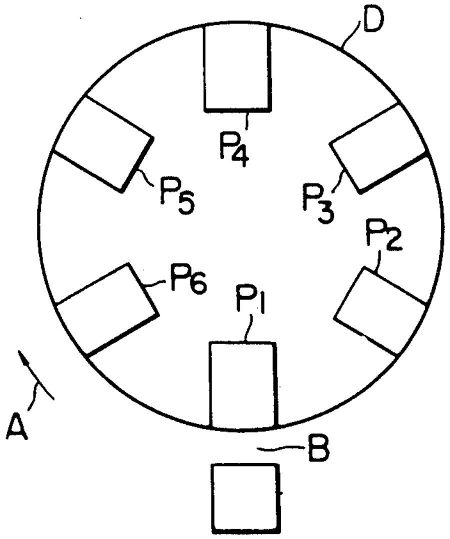
FIG. 3 is a schematic diagram illustrating a note drum.

A note-issuing drum D is constructed as shown in FIG. 3, for instance. Note-issuing sections $P_1$ through $P_6$ are positioned in the form of a circuit. These sections rotate in a direction of an arrow mark indicated in FIG. 3. Any of the sections stops at a position B and performs the note-issuing operation one at a time. In the sections $P_1$ through $P_6$ notes of 10,000 yen, 5,000 yen, 1,000 yen, 500 yen and 100 yen, and coins of 10 yen are respectively placed, for instance. The order in which the note-issuing sections are stopped at the position B, is set by a drum-setting circuit DS, and is set as $P_1 \rightarrow P_3 \rightarrow P_5 \rightarrow P_6$ in the case where predetermined notes are to be issued up to nine sheets thereof. In the case when a minimum number of notes or bills — that is, a bill of 5,000 yen and four bills of 1,000 yen each are to be issued for the amount of money 9,000 yen, the order is set by a memory check circuit MC and a drum-setting circuit.

Figure 4:
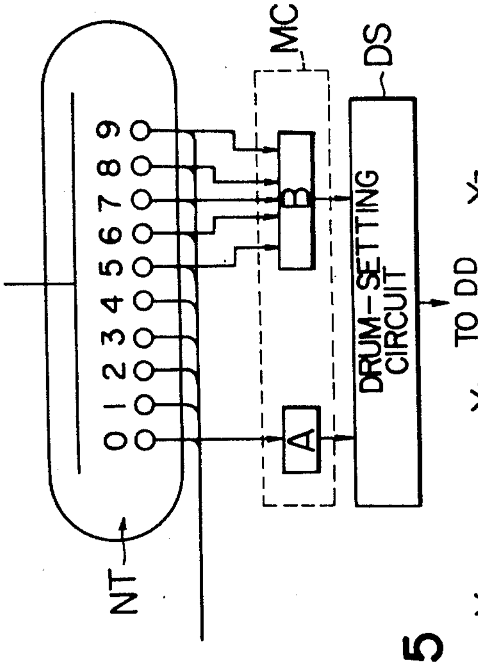
FIG. 4 is a circuit diagram exhibiting the connection of a memory check circuit and a numeral display tube.

Shown in FIG. 4 is a circuit illustrating connection of the memory check circuit MC and a numeral display tube NT of the display unit CDP adapted to display an amount of money. With respect to the places of 1,000 yen and 100 yen for instance, the "0" terminal of the display tube NT becomes low in level when the terminal is on. In detection of this, if display on the display tube is not 0, a circuit A in the memory check circuit MC is made to work. In the case where any of terminals 5 to 9 is low in level, a circuit B of the memory check circuit MC is made to work. Therefore, it can be concluded that when only the circuit A is operated, any of the numerals 1 to 14 is displayed on the display tube, while when both circuits A and B are operated any of the numerals 5 to 9 is displayed. Through this arrangement, a program for issuing notes is determined.

Accordingly, in the case when the display of the amount of money is 109,500 yen, the order in which the note-issuing sections $P_1$ through $P_6$ of the drum D are stopped at the position B, is set as $P_2 \rightarrow P_3 \rightarrow P_4 \rightarrow P_5 \rightarrow P_6$. If the display is 103,200 yen, the order is set as $P_1 \rightarrow P_3 \rightarrow P_5 \rightarrow P_6$.

When registering in the shift register SR is completed and then the note-issuing instruction is applied to the drum-driving circuit DD, the note-issuing section $P_1$ begins to issue 10,000 yen notes, and the number of the issued notes is read out by a reading device RD. Signals from the reading device RD are succeedingly counted by a count memory circuit CT and are compared with the contents of the most significant digit MSD and of the digit MSD-1 next to the most significant digit of the register $SR_2$ by means of a comparator CR.

When the contents of the most significant digit MSD and the digit MSD-1 next to the most significant digit MSD coincide with the content of the count memory circuit CT, a coincidence signal is issued. The coincidence signal is fed to the drum-driving circuit DD thereby stopping the note-issuing operation of the note-issuing section $P_1$. Therefore, the drum D rotates until the next note-issuing section comes to stop at the position B. At the same time, the coincidence signal is applied, as a shift pulse, to the shift register $SR_2$ through the encoder En, pulse generator PG and switching circuit $C_1$, thereby to shift the content of the register $SR_2$ one digit leftwardly.

Accordingly, a decimal numeral "9" is registered on the digit MSD-1 next to the most significant digit. With respect to digits for 1,000 yen and lower, the comparator CR is arranged so as to compare the contents of the MSD-1 digit and those of the count memory circuit CT.

Figure 5:
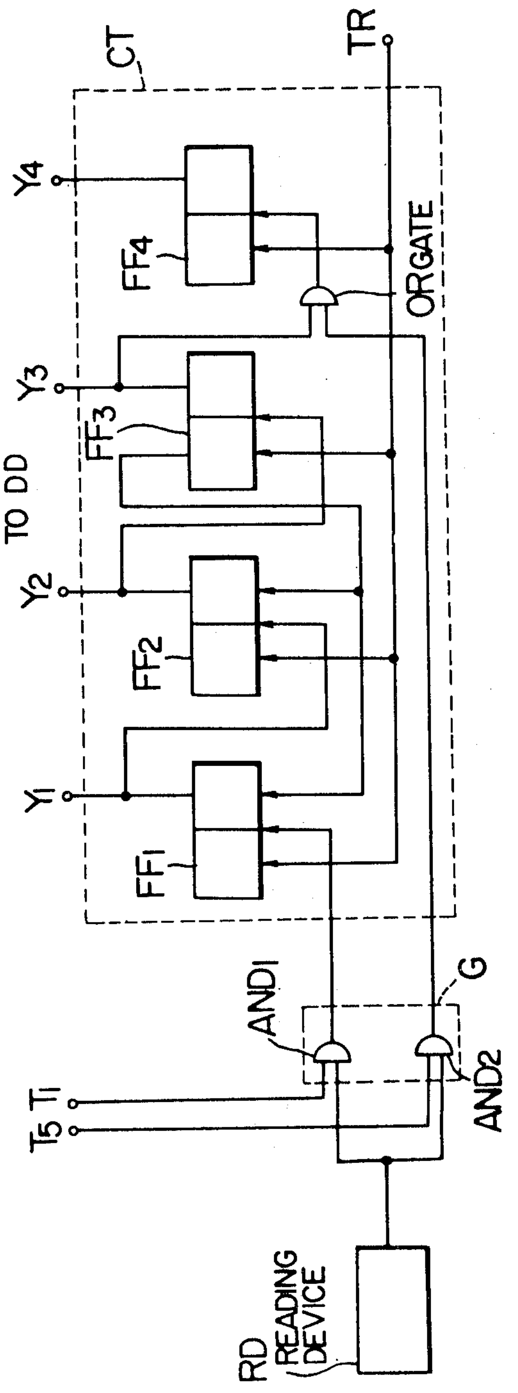
FIG. 5 is a circuit diagram explaining in detail a note-counting memory circuit shown in FIG. 1.

Shown in detail in FIG. 5 are the count memory circuit CT and the gate circuit G illustrated in FIG. 1. An output of the reading device RD is applied through the gate circuit G to the count memory circuit CT where the output is counted. In the count memory circuit CT, a quinary count circuit comprising flip-flops $FF_1$ to $FF_3$ and a binary count circuit comprising a flip-flop $FF_4$ are connected in cascade. The outputs of output terminals $Y_1$ to $Y_4$ are similar to the code outputs shown in the previously mentioned table. Terminals $T_5$ and $T_1$ are adapted to control application of the output of the reading device RD to the count memory circuit according to the denominations of the bills and coins. Thus, when the note-issuing sections $P_2$ and $P_4$ of the drum are stopped at the position B, respectively, the output of the reading device RD is made to pass exclusively through a logic circuit $AND_2$ by application of a predetermined voltage to the terminal $T_5$; and similarly, when the note-issuing sections $P_1$, $P_3$, $P_5$ and $P_6$ are stopped at the position B, respectively, the output of the reading device RD is made to pass exclusively through logic circuit $AND_1$ by application of a predetermined voltage to the terminal $T_1$.

Accordingly, as soon as one sheet of 5,000 yen note is issued by the note-issuing section $P_2$, the count memory circuit CT counts "5" and its output will be "0001" which is arranged from the least significant digit. Then, the drum D is rotated thereby to bring the note-issuing section $P_3$ to the position B and to keep issuing of the notes. When the number of the issued notes becomes four, the output code of the count memory circuit CT will be "1111" which is arranged from the least significant digit. At this time, the content "1111" (decimal numeral 9) of the MSD-1 digit of the shift register SR coincides with that of the count memory circuit CT, whereby a coincidence signal is furnished from the comparison circuit CR. The signal is applied to the drum-driving circuit thereby to stop the note-issuing operation of the note issuing section $P_3$ and is further applied to a reset terminal $T_R$ shown in FIG. 5, as a result of which the count memory circuit is reset.

As described above, when an amount of money, 9,000 yen is to be issued, one bill of 5,000 yen and four bills of 1,000 yen are issued. In other words, bills or notes are issued with a minimum number thereof.

Next, the content of the register $SR_2$ is shifted one digit leftwardly by the coincidence signal. Similarly, the content of the MSD-1 digit of the register $SR_2$ and that of the count memory circuit CT are compared with each other. Thus, when one sheet of 500 yen note is issued, a coincidence signal is furnished from the comparison circuit CR thereby to stop the note-issuing operation of the note-issuing section $P_4$.

The digits for 100 yen and 10,000 yen are "0". Therefore, a coincidence signal is issued from the comparison circuit CR and no note is issued from the note-issuing sections $P_5$ and $P_6$.

Initially, digits for 100,000 yen and 10,000 yen are compared with the content of the count circuit CT by means of the comparison circuit CR. A count circuit having the same construction is further connected, in a cascade, to the count memory circuit CT of FIG. 5, and both count circuits are arranged so as to operate only when the MSD digit and the MSD-1 digit are compared therewith.

As illustrated above, when the whole note-issuing operation is achieved and all the digits lower than the MSD-1 digit of the shift register $SR_2$ become 0, it is detected by a proper detection circuit (not shown) thereby to issue a note issue completion signal. As a result, operation of the drum-driving circuit DD is stopped and a succeeding tape reading operation of the tape reader TR is started.

The method of issuing currency with a minimum number of bills thereof using the tape-reading operation is as described above. However, in the case when predetermined denominations of notes are to be issued up to 9 sheets of them, if the memory check circuit MC is separated from a drum-setting circuit DS and the order setting the note-issuing sections is set as $P_1 \rightarrow P_3 \rightarrow P_5 \rightarrow P_6$ by means of the drum-setting circuit, predetermined denominations of notes can be issued with a predetermined number of sheets through an operation similar to that described above.

Described hereinafter is an operation in which predetermined denominations of currency notes are automatically issued with a predetermined number of sheets thereof through utilization of a manual input signal.

Referring to FIG. 1 again, reference symbol TK represents a decimal keyboard adapted to register an amount of money to be issued and provided with push buttons 1 to 9, and Em is an encoder adapted to convert information furnished from the keyboard TK into the code shown in the Table mentioned previously. A tape input and a manual switching circuit $C_2$ are switched over to the manual side. Therefore, in the case where notes are to be issued with a minimum number thereof, if necessary, push buttons of the keyboard TK are depressed, the information from the keyboard is converted by the encoder Em into a code corresponding to the depressed push buttons. The code is in turn registered in the shift register $SR_2$ through buffer register BR. The code previously registered in the register $SR_2$ is shifted one digit leftwardly every time next push buttons are depressed. Thus, "109500", for instance, is registered in the register $SR_2$ by succeedingly depressing necessary push buttons. The operation after completion of this register operation, is just the same as that in the case of the tape reader. In order to issue predetermined denominations of notes up to nine sheets instead of a minimum number of sheets, the memory check circuit MC is separated from the drum-setting circuit DS and then the order setting the note-issuing sections is set as, for instance, $P_1 \rightarrow P_3 \rightarrow P_5 \rightarrow P_6$ by means of the drum-setting circuit, in the same manner as described above.

While the present invention has been described in connection with a case where particular currency bills are issued, it is to be clearly understood that the present invention can be applied to dispense currency bills and coins of any country, and the number of digits in each of the display units for an amount of money, memory circuit and shift register can be increased or decreased as required, and furthermore the note drum and the count memory circuit can be optionally constructed. In other words, it is intended that all the matter contained in the foregoing description and in the drawings shall be interpreted as illustrative and exemplary only and not as limitative of the present invention.

Figure 6:
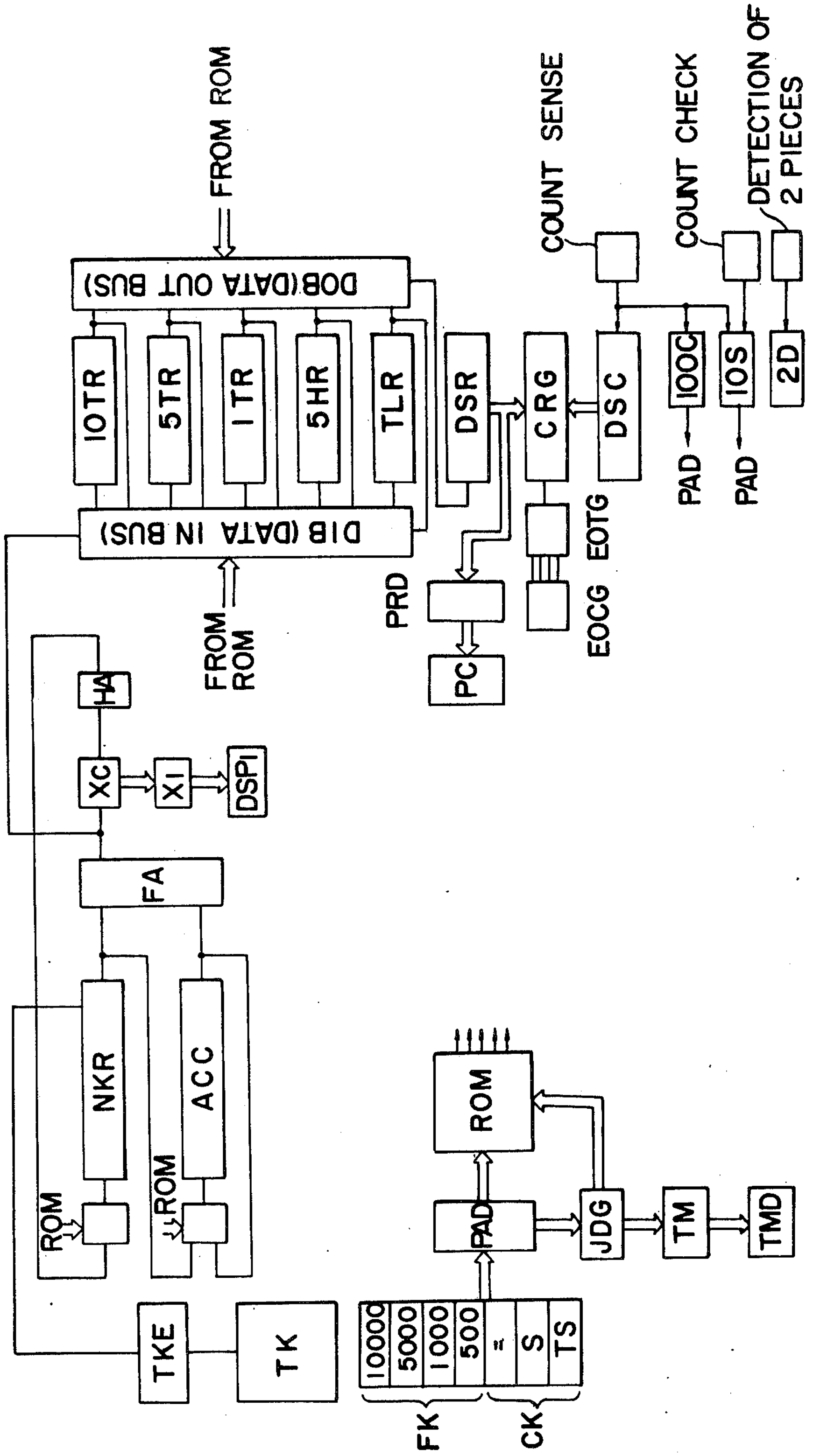
FIG. 6 is a block diagram illustrating a further embodiment according to the present invention.

FIG. 6 shows another embodiment of the present invention, which comprises a decimal keyboard TK operated by an operator and an encoder TKE encoding an input signal fed from the keyboard into a proper signal. Furthermore, the embodiment comprises function keys CK, a key FK used for designating any particular coin or bill, a number key register NKR which receives information given by the keyboard TK, and accumulator ACC which is a register adapted to temporarily store processing information, a full-adder FA which serves for addition of the content (nkr) of the number key register NKR and the content (acc) of the accumulator ACC, both the number key register NKR and the accumulator ACC having six digits, representatively. The embodiment of FIG. 6 further comprises: a one-digit register $X_c$, and a register $X_1$ for display; a display unit and its driving circuit $DSP_1$; a half-adder HA which is a circuit performing correction in an operational process; a register 10TR adapted to store an amount of money to be paid with the money of a 10,000 yen unit; registers 5TR, 1TR and 5HR which are similarly adapted to store amounts of money to be paid with the money of a 5,000 yen, a 1,000 yen and a 500 yen unit, respectively; a register DSR which is adapted to temporarily store an amount of money to be issued and which succeedingly stores the information stored in the registers 10TR, 5TR, 1TR and 5HR upon receiving of an instruction for starting the money-issuing operation; a counter DSC serving to count money issued out; a coincidence detector EOTG which furnishes a coincidence signal when the content (dsr) of the register DSR and the content (dsc) of the register DSC coincide with each other; a device EOCG which issues an EOC signal when all denominations of money have been compared and issued out upon receiving as its input the signal from the coincidence detector EOTG; a print decoder PRD which is a processing circuit adapted to print the information of the money-issuing operation after completion thereof; a printer control circuit PC; a detection section 10S which, when a money-issuing section has had ten idling operations in issuing the money, judges it as an abnormal operation; a counter 100C which, when a number of pieces indicated in issuing the money is more than 100, detects the fact the number of pieces of currency issued out has become 100, while all the money of the indicated number of pieces is not issued continuously at a time but it unitarily issued out every 100 pieces thereof; a circuit 2D which, when the money-issuing section is going to issue two pieces of currency at a time, detects it thereby furnishing an alarm signal; and a turret-setting memory TM which stores kinds of money instructed to be issued out and which designates kinds of money to be issued next in accordance with a predetermined order with respect to a turret-setting memory distributor TMD which receives a signal from the turret-setting memory TM thereby to set the turret through the instruction for starting the money-issuing operation and which out-puts a turret-switching instruction and an instruction renewing the content of the register DSR according to the signal issued from the coincidence detector EOTG.

The above-described circuits are provided for all the functions of the automatic money issuing device according to the invention.

Now, described hereinafter is a sequential control circuit adapted to control the abovementioned function-circuits.

A program-addressing circuit PAD stores, as its input information, key-out signals from the keys FK designating kinds of money as well as the function keys CK, and detection signals from the detection sections 10S and 100C, and further designates the program steps with respect to a device ROM described later. Reference symbol ROM represents an operation instruction group and a succeeding program-designating instruction group in combination, and produces a macro-instruction in order to routine the program of a process designated by the output signal of the program-addressing circuit PAD thereby to operate the process function circuit in order to be on standby for the next program. A circuit JDG issues a judge-instruction and judges an interruption when a process program not designated initially by the program addressing circuit PAD is produced thereby to issue a jump-transfer instruction and a stop-instruction to the device ROM.

The embodiment, according to the present invention, shown in FIG. 6 operates as follows:

During a standby period, the contents of the number key register NKR and of the accumulator ACC and the contents of other memory sections are cleared out whereby 0s are registered therein.

When a key "10000" of the keys FK designating kinds of money is designated and then an amount of money, e.g., 150,000 yen is registered by the decimal keyboard TK, the data 150,000 is converted into a proper signal which is fed to the number key register NKR. The data thus fed to the number key register NKR circulate in a closed loop of NKR → FA → Xc → Ha → NKR, and is fed to the register 10TR. The one-digit register Xc included in the closed loop reads out each digit of circulating data one after one and the circulating data thus read out are fed to the display register Xc. Therefore, the display unit $DSP_1$ repeates the display of each digit one after one. In other words, the display unit $DSP_1$ displays the digits in a divisional manner. The divisional display thus made is repeated at a sufficiently high speed, and is therefore seen as a complete display by human eyes due to an after-image phenomenon, as a result of which the eyes will not get tired.

Now, if a key "=" of the function keys CK is operated, the content of the number key register NKR and the content of the accumulator ACC are added by the adder FA, and the resultant value of the addition circulates in the loop of NKR → FA → Xc → Ha → NKR. In this case, the content of the accumulator ACC is zero ($acc = 0$), and therefore the content of the number key register NKR is "150000".

Next, in the case when a key "5000" of the keys FK is designated, the data circulating in the closed loop of NKR → FA → Xc → Ha → NKR is fed to the accumulator ACC whereby the content of the closed loop is cleared out, as a result of which the display unit $DSP_1$ displays zero. Then, if an amount of money, for instance, "45000" is registered by means of the decimal keyboard TK, the registered value is read in the number key register NKR in the same manner as mentioned above. The data 45000 circulates in the closed loop of NKR → FA → Xc → HA → NKR and the $DSP_1$ displays the data 45000 in a divisional manner as stated above. Furthermore, the circulating data 45000 is stored in the register 5TR. In addition, the registers 10TR, 5TR, 1TR, 5HR and TLR are adapted to circulate respective inputs therethrough, thereby to be stored therein, respectively.

Then, similar to the above operation, if the key = of the function keys CK is operated, the above-mentioned data, i.e., the content ($nkr = 45000$) of the number key register NKR and the content ($acc$ = 150000) of the accumulator ACC are added by the adder FA thereby to become new circulating data. At this time, the content (acc) of the accumulator is cleared out into zero, and the display unit $DSP_1$ displays the circulating data ($nkr + acc \quad nkr$) 195000 in a divisional manner mentioned previously.

Similarly, if "33000" and "4500" are registered by operation of keys "1000" and "500", respectively, and then the key = of the function keys FK is operated, data (nkr) circulating in the closed loop of NKR → FA → Xc → HA → NKR becomes 232500 and the data 232500 are stored in the register TLR. The $DSP_1$ displays this data 232500 in a divisional manner as described previously.

The information fed by the decimal keyboard as described above, is added and processed successively through the number key register NKR, the accumulator ACC and the adder FA, and is stored in the registers 10TR, 5TR, 1TR, 5HR and TLR. After receiving an instruction for starting the money-issuing operation the embodiment according to the illustration in FIG. 6 operates as follows:

A turret is selected through the money issue start instruction whereby a frame containing the money of 10,000 yen is set at a predetermined position. At the same time, the content (150000) of the register 10TR is temporarily transferred to the register DSR. When the turret is set at a predetermined position, a money-issuing instruction is fed to a mechanism adapted to issue money whereby money of 10,000 yen is issued. The money thus issued is detected by a count detection section and its count value converted into an amount of money is furnished from the counter DSC. Then, both the contents of the register DSR and of the counter DSC are compared with each other by means of the comparator EOTG which issues a coincidence signal $eot_1$ when both contents mentioned above coincide with each other. By the coincidence signal $eot_1$, the money-issuing operation is stopped and the turret is switched for the money of 5,000 yen. On the other hand, the content of the register DSR is cleared out and the content 45000 of the register 5TR is transferred out. When a frame containing the money of 5,000 yen is set at a predetermined position, the money-issuing mechanism is operated again, whereby the money of 5,000 yen is issued out.

As described above, when the operation with respect to a payment process is continued whereby issuing of the money of 500 yen is completed, the comparator EOTG issues coincidence signals $eot_1$ (10,000), $eot_2$ (5,000), $eot_3$ (1,000), and $eot_4$ (500) to the device EOCG which in turn confirms the coincidence signal $eot_1$ to $eot_4$ thereby to detect the completion of the money-issuing operation. A printing operation of the process information is started by the money-issue completion signal furnished from the device ECCG.

Now, the content (150000) of the register 10TR is transferred to the register DSR again, and is converted into a printing signal by means of the print decoder PRD. The thus obtained printing signal is applied to the printer control whereby the content of the register 10TR is printed. In the same way, the contents of the registers 5TR, 1TR, 5HR and TLR are printed, respectively. Thus, the money-issuing process is completed.

What is claimed is:

1. An automatic money dispensing apparatus for automatically dispensing a specified amount of money, which comprises:

input means for inputing data on the amount of money to be dispensed;

memory means for storing the data from said input means;

a memory discriminating circuit for discriminating the content of said memory means, said discriminating circuit comprising a first detection circuit for detecting that the content of the memory means is zero, and a second detection circuit for detecting that the content of the memory means is a predetermined amount other than zero; and money dispensing means for dispensing money in denominations corresponding to the content stored in said memory means in response to a detection signal produced by said memory discriminating circuit.

* * * * *